(12) United States Patent
Tang

(10) Patent No.: US 6,379,760 B1
(45) Date of Patent: *Apr. 30, 2002

(54) LAMINATING APPARATUS

(75) Inventor: Luen Sing Tang, Phase B (CN)

(73) Assignee: Tecksom International Limited, Nassau (BS)

( * ) Notice: Subject to any disclaimer, the term of this patent is extended or adjusted under 35 U.S.C. 154(b) by 0 days.

This patent is subject to a terminal disclaimer.

(21) Appl. No.: 09/284,510

(22) PCT Filed: Oct. 14, 1997

(86) PCT No.: PCT/GB97/02836

§ 371 Date: Jun. 15, 1999

§ 102(e) Date: Jun. 15, 1999

(87) PCT Pub. No.: WO98/16382

PCT Pub. Date: Apr. 23, 1998

(30) Foreign Application Priority Data

Oct. 14, 1996 (GB) .............................................. 9621385

(51) Int. Cl.⁷ .............................................. B32B 31/00
(52) U.S. Cl. ........................ 428/35.2; 428/58; 428/201; 428/202; 428/203; 226/19; 156/64; 156/298; 156/361; 156/544; 156/554
(58) Field of Search .......................... 428/35.2, 53, 58, 428/201, 202, 203, 35.5; 156/64, 297, 298, 300, 324, 361, 362, 363, 544, 552, 554; 226/18–20

(56) References Cited

U.S. PATENT DOCUMENTS

| | | | |
|---|---|---|---|
| 2,196,633 A | | 4/1940 | Johnstone |
| 2,641,416 A | | 6/1953 | McCleary et al. |
| 2,651,408 A | * | 9/1953 | Engberg et al. ................ 428/47 |
| 2,735,630 A | | 2/1956 | Ziebolz et al. |
| 2,828,435 A | * | 3/1958 | Hoyt ............................ 313/462 |
| 2,894,292 A | * | 7/1959 | Gramelspacher ............... 52/474 |
| 3,900,360 A | * | 8/1975 | Leatherman ............... 156/272.4 |
| 4,294,637 A | | 10/1981 | Rump |
| 4,485,982 A | * | 12/1984 | St. John et al. ............. 242/57.1 |
| 4,798,752 A | * | 1/1989 | McLoughlin et al. ........ 428/34.9 |
| 4,837,072 A | * | 6/1989 | Kraetschmer ................ 428/201 |
| 4,888,717 A | * | 12/1989 | Ditto et al. .................. 364/559 |
| 4,978,401 A | * | 12/1990 | Bonomi ........................ 156/64 |
| 5,098,507 A | * | 3/1992 | Mao ............................ 156/351 |
| 5,167,754 A | | 12/1992 | Lutzow et al. |
| 5,460,672 A | * | 10/1995 | Mallonee ..................... 156/73.4 |
| 5,587,037 A | * | 12/1996 | Fellner ........................ 156/231 |
| 5,702,789 A | * | 12/1997 | Fernandez-Kirchberger et al. .......................... 428/40.1 |
| 5,942,077 A | * | 8/1999 | Tang ............................ 156/361 |

FOREIGN PATENT DOCUMENTS

| | | |
|---|---|---|
| GB | 1443155 | 11/1972 |
| GB | 2259503 | 3/1993 |

* cited by examiner

Primary Examiner—Rena L. Dye

(57) ABSTRACT

The invention provides an apparatus and a process for producing laminated materials. The process comprises the steps of: (a) supplying material from a first supply roller; (b) supplying materials from a system comprising a plurality of further supply rollers; (c) tracking lateral movement of the material leaving said first supply roller; and (d) adjusting the lateral position of said system in response to said lateral movement, such that the lateral alignment of the plurality of further supply rollers remains constant with respect to the material leaving the first supply roller. The adjustment step (d) may be manual, or it may be automatic e.g. in response to tracking in step (c) by means of an electronic sensor which tracks a control line on the material leaving the first supply roller. By maintaining constant lateral alignment, it is possible to manufacture laminated materials comprising a layer made from strips of material which abut but which do not overlap.

11 Claims, 2 Drawing Sheets

LAMINATING APPARATUS

This application is the national phase under 35 U.S.C. §371 of PCT International Application No. PCT/GB97/02836 now WO98/16382, which has an International filing date of Oct. 14, 1997 which designated the United States of America.

BACKGROUND OF THE INVENTION

1. Field of the Invention

This invention relates to apparatus and methods for producing laminated materials, for example such as are used in packaging.

2. Related Art

Goods such as processed food, sweets, medication and liquids are often packaged in material which isolates them from water, gas, vapour, oil, chemicals and the like. This packaging material is usually decorated in order to distinguish the product from similar goods, for instance, or to provide directions for use, to list ingredients or to provide statutory information.

Typical material for this purpose is made from single or double layered transparent plastics over-printed with the desired design, with double layered materials offering better protection to goods.

In order to enhance the visual appeal of a package or to provide a degree of protection against counterfeiting it may also be desirable to add metallised effects, such as holograms, within such multi-layered material. The resulting laminated packaging material typically comprises a sheet of aluminium foil or holographic film sandwiched, and thus protected, between two sheets of transparent polyethylene or polypropylene, one or both of which could be over-printed with a design. This material is not transparent, however, due to the presence of the opaque retallised layer.

It would be desirable to have available a packaging material which includes a metallised layer but through which the contents of a package are visible. This could be achieved by sandwiching strips of metallised material, rather than whole sheets, between outer transparent layers. In the regions where the metallised layer is absent the material is thus transparent.

However, simply laminating strips of foil within two plastic layers is not feasible on a mass production basis. The final laminated material will not be of uniform thickness and this will be magnified when it is rolled up, for instance. It is therefore necessary for the middle layer to include strips of transparent material parallel and adjacent to the metallised material to provide a layer with as constant a thickness as possible.

A desirable laminated material would thus be of substantially uniform thickness, having five layers ie.:

(A) a transparent film made from a material such as polypropylene or polyethylene, probably decorated with a design;

(B) an adhesive layer;

(C) a layer consisting of a combination of parallel strips of different materials in the same plane or surface. These strips might be, for instance, lightline aluminium metallised or partially-metallised laminating foil, metallised polypropylene film, aluminium foil, or transparent polypropylene or polyethylene;

(D) a further adhesive layer; and (E) a heat-sealable or heat-melting film allowing easy application for an automatic packaging system.

Such laminated packaging materials would typically be manufactured according to the following process. The materials which make up layers (A) and (C) are loaded onto separate supply rollers. Material (A) proceeds from its supply roller through a glue tank, where an adhesive layer (B) is applied to its back surface, and then through a drying tunnel. The strips which form layer (C) issue from the relevant supply rollers and meet material (A) emerging from the drying tunnel (A) at an assembly roller. Layer (C) is bonded to adhesive layer (B) to form a laminated material (AC) which is collected on receiving roller.

To complete the packaging material, the laminate (AC) is removed from the receiving roller and re-loaded onto a supply roller. The process is repeated on material (AC), with adhesive being applied to layer (C) and heat-sealable film (E) being attached to form finshed product (ACE) laminate.

A significant problem when manufacturing laminated material in this way, however, is the alignment of the strips in layer (C). The strips, which might be of differing widths, will generally issue from separate supply rollers which might have drums of different diameters and different motor speeds. The different materials will tend to have different tensile strengths, different coefficients of friction, and different thicknesses.

SUMMARY OF THE INVENTION

During bonding at the assembly roller, aligning the strips in parallel on the same plane or surface without an overlap has so far not been possible. Avoiding wrinkles, creases, breakage, and deformation of strips during lamination is also difficult. These problems, of course, cause wastage of materials and interruption of the production line. Furthermore, the alignment of the layers at the assembly roller is liable to change due, for instance, to vibration of the machine and for these reasons current machines and processes of manufacture are, in general, limited to just two strips.

There is thus a need for a laminating process in which the strips which make up layer (C) can be accurately aligned relative to layer (A), and in which the strips which make up layer (C) can be aligned without overlap.

According to the present invention there is provided an apparatus for producing laminated materials having a first supply roller, and a system comprising a second and a third supply roller, wherein the lateral positioning of said system can be adjusted in response to lateral movement of material which leaves the first supply roller, such that the lateral alignment of the second and third supply rollers remains constant with respect to said material.

The lateral positioning of said system may be adjusted manually during operation of the apparatus in order to maintain alignment of the second and third supply rollers with said material. Preferably, however, lateral movement of material which leaves said first supply roller is monitored by an electronic sensor which tracks a control line in the material. The output of the sensor can be used to adjust the position of said system automatically.

The control line can be any feature whose lateral movement can be tracked by an electronic sensor. The control line is preferably a visible coloured line but might be, for instance, a thin magnetic strip. Preferably such control lines have a width of 0.5 mm to 3.0 mm. Such control lines need not be continuous, but they must be electronically readable. Alternatively, the control line can be the edge of the material leaving the first supply roller.

The electronic sensor can be any sensor which is capable of accurately tracking the lateral movement of a control line.

Preferably the electronic sensor can track various types of control line. Suitable sensors are well known in the art for line and edge detection and these typically comprise a tungsten lamp and a CdS light detector which picks out very small changes in resistance as the control line meanders. Depending on the reflection efficiency, different filters can be used with the detector. For instance, where reflection is efficient a ground glass filter might be used.

Preferably the electronic sensor is fixed to the system comprising the second and third supply rollers such that the system and sensor move in concert.

Preferably the lateral positions of the second and third supply rollers are independently adjustable within the system although during operation of the apparatus the lateral positions should remain fixed relative to each other.

According to a further aspect of the invention, there is provided a process for producing a laminated material comprising the steps of:

(a) supplying material from a first supply roller;

(b) supplying materials from a system comprising a plurality of further supply rollers;

(c) tracking lateral movement the material leaving said first supply roller; and (d) adjusting the lateral position of said system in response to said lateral movement, such that the lateral alignment of the plurality of further supply rollers remains constant with respect to the material leaving the first supply roller.

Whilst adjustment step (d) may be effected manually, it is preferably effected automatically. For instance, the output of an electronic sensor which tracks lateral movement in material leaving the first supply roller may be used to control the lateral positioning of the plurality of supply rollers automatically.

Preferably, therefore, tracking step (c) involves tracking lateral movement in a control line in the material leaving said first supply roller by means of an electronic sensor.

The materials leaving said plurality of further supply rollers should all be of substantially the same thickness as each other. Preferably one or more of these materials is a holographic or metallic material.

The positions of the plurality of further supply rollers should be fixed relative to each other, such that their lateral positions remain constant with respect to each other. Preferably the plurality comprises 3 or morb supply rollers.

According to a further aspect of the invention, there is provided a laminated material obtainable by a process as set out above.

Similarly, the invention also provides a laminated material comprising a layer made up of a plurality of parallel strips of material which abut and do not overlap.

Preferably the layer made up of abutting strips comprises at least three strips, one or more of which is a holographic or metallic strip. Preferably such a strip is bordered by transparent or translucent strips. More preferably, the layer comprises strips of transparent or translucent material alternating with opaque strips (eg. made from holographic or metallic material).

The layers will typically be joined to each other by adhesive. Accordingly, the invention provides laminated material having a transparent layer, an adhesive layer, and a layer comprising a plurality of parallel strips of material which abut and do not overlap. One of said strips is preferably a holographic or metallic strip Of course, it will be appreciated that said "transparent" layer may be over-printed with a design, for instance, which renders it only partially transparent.

These laminated materials may also comprise further layers. Preferably, therefore, the invention provides a laminated material as above, further comprising a fourth layer. This fourth layer may, for instance, be a heat-sealable layer or a layer of adhesive. The laminated material may also comprise a fifth layer, which may be made from the same material as the first layer, for instance, or may be a heat-sealable layer.

These laminated materials can be used for shrink-wrapping, for example, or during the manufacture of bags or pouches.

The invention also provides the use of a electronically-readable control line on material leaving a first supply roller to control the alignment of a plurality of further supply rollers with respect to said material.

BRIEF DESCRIPTION OF THE DRAWINGS

A specific preferred embodiment of the invention will now be described by way of example with reference to the accompanying drawings in which.

DETAILED DESCRIPTION OF THE PREFERRED EMBODIMENTS

Figure 1:
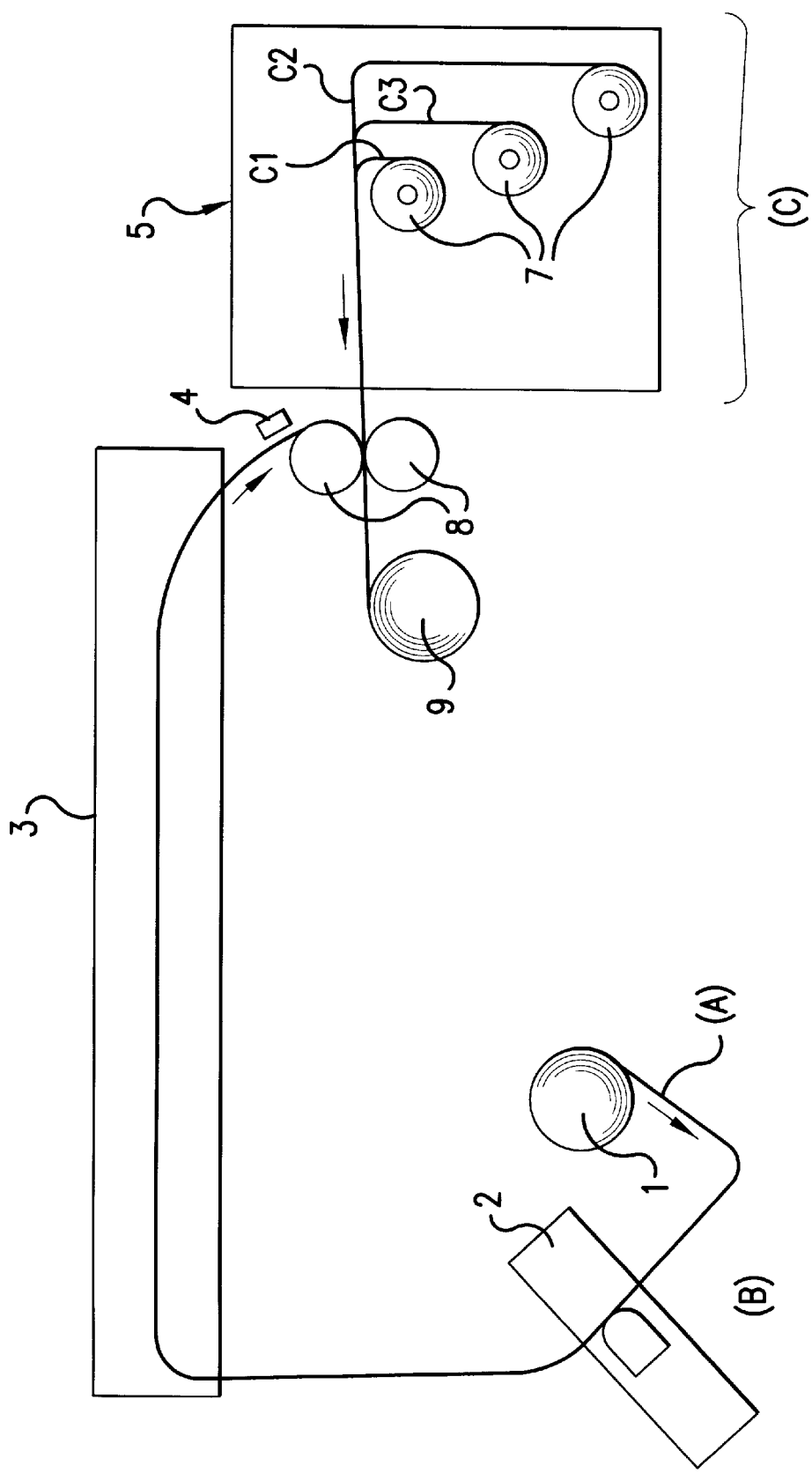
FIG. 1 illustrates the apparatus and FIG. 2 shows the materials being laminated at the assembly roller (8).

The apparatus in FIG. 1 is for bonding two layers (A) and (C) to form a laminated material. Layer (A) might, for example, be a transparent film made from polyethylene, over-printed with a design. Layer (C) is formed from a series of adjacent parallel strips ($C_1, C_2, C_3, \ldots$) which abut and do not overlap. The strips might, for instance, be a wide transparent strip ($C_1$) abutting with a thin metallised holographic strip ($C_2$) abutting with a wide translucent strip ($C_3$)

Transparent film (A) is loaded onto supply roller (1) and its tension is adjusted. Similarly, the strips ($C_1, C_2, C_3, \ldots$) which form layer (C) are loaded onto supply rollers (7) which are mounted in system (5). The tensions of the supply rollers (7) are adjusted and the rollers (7) are laterally arranged such that the edges of the strips leaving the rollers (7) which make up layer (C) will abut.

During operation film (A) proceeds through the glue tank (2), where adhesive layer (B) is applied to its back surface, and then into drying tunnel (3).

Film (A) with adhesive layer (B) emerges from the drying tunnel (3) and reaches a point where electronic sensor (4) is situated. In this preferred embodiment, film (A) contains a control line (X) which is still electronically readable through the dried adhesive layer (B). Electronic sensor (4) is initially positioned so that control line (X) will be within its range of detection when film (A) passes beneath.

In the course of the laminating process, small lateral changes in the travel path of film (A) occur. The electronic sensor (4) detects these changes by tracking the position of the control line (X) in film (A) and transmits details of these changes to system (5) which comprises a supporting frame (6) on which a plurality of supply rollers (7) are mounted and secured. Each roller (7) is independently laterally adjustable vis-a-vis the other rollers (7) but during operation the rollers (7) are fixed relative to each other. Each roller (7) possesses its own speed reducer motor and tension detector.

In response to the signals from sensor (4), the lateral position of system (5) is adjusted. Rollers (7) thus move together relative to assembly roller (8) and the alignment of material (A) and the materials from rollers (7), which make up layer (C), remains constant.

Figure 2:
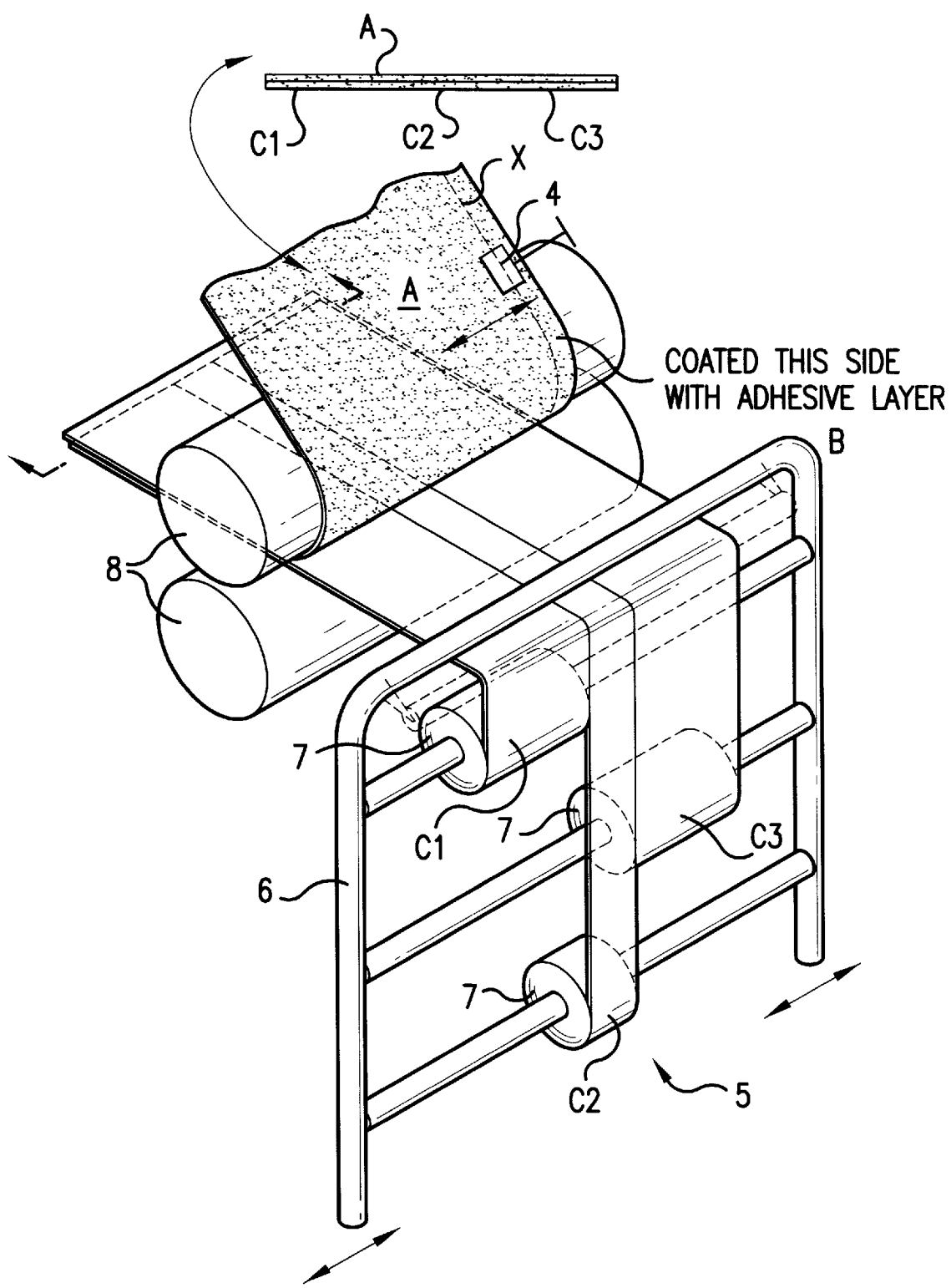

As shown in FIG. 2, tie strips ($C_1, C_2, C_3, \ldots$) forming layer (C) emerge from system (5) precisely aligned with film (A). At heated assembly roller (8) layer (A) meets the strips which form layer (C). The strips are bonded to adhesive layer (B) to form a laminated material (AC) which is collected on receiving roller (9)

To complete the packaging material, the laminate (AC) is removed from receiving roller (9) and re-loaded onto supply roller (1), After due adjustment of tension, the process is repeated on material (AC ), with adhesive being applied to layer (C) and heat-sealable film (E) being attached to form finished product (ACE) laminate.

The laminate (ACE) is left at an appropriate temperature for about 12 to 48 hours to let the layers settle before being used for packaging.

It will be understood that the invention is described above by way of example only and modifications may be made within the scope and spirit of the invention.

What is claimed is:

1. A process for producing a laminated material comprising the steps of:
   (a) supplying material from a first supply roller;
   (b) supplying materials from a system comprising a plurality of further supply rollers, the materials being laterally aligned in an abutting, non-overlapping relationship;
   (c) tracking lateral movement of the material leaving said first supply roller;
   (d) adjusting the lateral position of said system in response to said lateral movement, such that the lateral alignment of the plurality of further supply rollers remains constant with respect to the material leaving the first supply roller.

2. A process according to claim 1, wherein step (c) comprises tracking lateral movement in a control line in the material leaving said first supply roller by means of an electronic sensor.

3. A process according to claim 1, wherein the plurality of further supply rollers comprises 3 or more supply rollers.

4. A process according to claim 1, wherein the materials leaving said plurality of further supply rollers are all of substantially the same thickness as each other.

5. A bag made from laminated material according to claim 1.

6. An apparatus for producing laminated materials, having a first supply roller and a system comprising a second and a third supply roller, wherein the lateral positioning of said system can be adjusted in response to lateral movement of material which leaves the first supply roller, such that the lateral alignment of the second and third supply rollers remains constant with respect to said material.

7. An apparatus according to claim 6, further comprising an electronic sensor which tracks a control line in thy material leaving said first supply roller.

8. An apparatus according to claim 7, wherein said control line is a visible coloured line.

9. An apparatus according to claim 7, wherein said control line is the edge of the material leaving said first supply roller.

10. An apparatus according to claim 7, wherein said electronic sensor is fixed to said system much that the system and sensor move together.

11. An apparatus according to claim 7, wherein the lateral positions of the second and third supply rollers are independently adjustable within said system.

* * * * *